(12) United States Patent
Miu et al.

(10) Patent No.: US 10,850,595 B2
(45) Date of Patent: Dec. 1, 2020

(54) VEHICULAR SENSING SYSTEM WITH ATTENUATION OF REFLECTED-REFRACTED LIGHT OFF OF PRECIPITATION USING LIGHT POLARIZATION

(71) Applicant: Magna Electronics Inc., Auburn Hills, MI (US)

(72) Inventors: Traian Miu, Oakville (CA); Gabriele W. Sabatini, Keswick (CA)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 16/295,368

(22) Filed: Mar. 7, 2019

(65) Prior Publication Data

US 2019/0279013 A1    Sep. 12, 2019

Related U.S. Application Data

(60) Provisional application No. 62/639,584, filed on Mar. 7, 2018.

(51) Int. Cl.
*B60J 3/06* (2006.01)
*G06K 9/20* (2006.01)
(Continued)

(52) U.S. Cl.
CPC ............... *B60J 3/06* (2013.01); *B60Q 1/085* (2013.01); *B60Q 1/143* (2013.01); *B60Q 1/1423* (2013.01);
(Continued)

(58) Field of Classification Search
CPC ........... B60J 3/06; B60Q 1/143; B60Q 1/1423
See application file for complete search history.

(56) References Cited

U.S. PATENT DOCUMENTS 2,475,704 A * 7/1949 Gruben .................... B60J 3/06
                                                        359/488.01
4,764,410 A    8/1988 Grzywinski
(Continued)

FOREIGN PATENT DOCUMENTS

GB         2397455 A  *  7/2004  ............... B60J 3/06
WO    WO-2018186766 A1 * 10/2018  ............... B60J 3/06

OTHER PUBLICATIONS

D. Lindsey, "Linear Polarizer vs Circular Polarizer: What's the difference?", Lindsey Optics (Feb. 10, 2018) (Year: 2018).*

*Primary Examiner* — David N Werner
(74) *Attorney, Agent, or Firm* — Honigman LLP

(57) ABSTRACT

A sensing system for a vehicle includes a sensor disposed at a vehicle and a control that includes a processor for processing sensor data captured by the sensor. A first polarizer is disposed in a light emitting path of at least one light source of the vehicle and a second polarizer is disposed in a light receiving path of the sensor. The second polarizer has an opposite-handed polarization configuration relative to the first polarizer. Some of the polarized light as polarized by the first polarizer impinges precipitation present in the field of sensing of the sensor and returns toward the sensor as refracted-reflected light. The second polarizer attenuates the refracted-reflected light and allows light reflected from objects present in the sensor's field of sensing to pass through to the sensor. The control, responsive to processing of captured sensor data, detects objects in the field of sensing of the sensor.

20 Claims, 4 Drawing Sheets

(51) Int. Cl.
  *B60Q 1/08*    (2006.01)
  *B60Q 1/14*    (2006.01)
  *F21S 41/135*  (2018.01)
  *G06K 9/00*    (2006.01)
  *H04N 5/225*   (2006.01)
  *B60R 1/00*    (2006.01)
  *B60Q 1/076*   (2006.01)

(52) U.S. Cl.
  CPC ............ *F21S 41/135* (2018.01); *G06K 9/209* (2013.01); *G06K 9/2036* (2013.01); *B60Q 1/076* (2013.01); *B60Q 2300/312* (2013.01); *B60R 1/00* (2013.01); *B60R 2300/301* (2013.01); *G06K 9/00791* (2013.01); *H04N 5/2254* (2013.01)

(56) References Cited

U.S. PATENT DOCUMENTS

| | | |
|---|---|---|
| 4,766,023 A | 8/1988 | Lu |
| 5,094,788 A | 3/1992 | Schrenk et al. |
| 5,122,905 A | 6/1992 | Wheatley et al. |
| 5,122,906 A | 6/1992 | Wheatley |
| 5,254,388 A | 10/1993 | Melby et al. |
| 5,269,995 A | 12/1993 | Ramanathan et al. |
| 5,389,324 A | 2/1995 | Lewis et al. |
| 5,447,353 A * | 9/1995 | Cheng .................. B60J 3/06 296/97.2 |
| 5,594,830 A | 1/1997 | Winston et al. |
| 5,715,093 A | 2/1998 | Schierbeek et al. |
| 5,796,094 A | 8/1998 | Schofield et al. |
| 5,808,794 A | 9/1998 | Weber et al. |
| 5,825,542 A | 10/1998 | Cobb, Jr. et al. |
| 5,828,488 A | 10/1998 | Ouderkirk et al. |
| 5,867,316 A | 2/1999 | Carlson et al. |
| 5,872,653 A | 2/1999 | Schrenk et al. |
| 5,882,774 A | 3/1999 | Jonza et al. |
| 5,962,114 A | 10/1999 | Jonza et al. |
| 5,965,247 A | 10/1999 | Jonza et al. |
| 5,976,424 A | 11/1999 | Weber et al. |
| 6,018,419 A | 1/2000 | Cobb, Jr. et al. |
| 6,025,897 A | 2/2000 | Weber et al. |
| 6,057,961 A | 5/2000 | Allen et al. |
| 6,080,467 A | 6/2000 | Weber et al. |
| 6,088,067 A | 7/2000 | Willett et al. |
| 6,088,159 A | 7/2000 | Weber et al. |
| 6,101,032 A | 8/2000 | Wortman et al. |
| 6,117,530 A | 9/2000 | Jonza et al. |
| 6,124,971 A | 9/2000 | Ouderkirk et al. |
| 6,141,149 A | 10/2000 | Carlson et al. |
| 6,157,490 A | 12/2000 | Wheatley et al. |
| 6,296,927 B1 | 10/2001 | Jonza et al. |
| 6,307,676 B1 | 10/2001 | Merrill et al. |
| 6,352,761 B1 | 3/2002 | Hebrink et al. |
| 6,353,392 B1 | 3/2002 | Schofield et al. |
| 6,449,092 B1 | 9/2002 | Weber et al. |
| 6,449,093 B2 | 9/2002 | Hebrink et al. |
| 6,498,683 B2 | 12/2002 | Condo et al. |
| 6,574,045 B2 | 6/2003 | Hebrink et al. |
| 6,583,930 B1 | 6/2003 | Schrenk et al. |
| 6,613,421 B2 | 9/2003 | Jonza et al. |
| 6,630,970 B2 | 10/2003 | Trapani et al. |
| 6,635,337 B2 | 10/2003 | Jonza et al. |
| 6,641,883 B2 | 11/2003 | Weber et al. |
| 6,645,801 B1 * | 11/2003 | Ramsbey .......... H01L 21/76889 257/314 |
| 6,690,268 B2 | 2/2004 | Schofield et al. |
| 7,855,755 B2 | 12/2010 | Weller et al. |
| 9,170,428 B1 * | 10/2015 | Markut .................. B60J 3/06 |
| 2012/0162961 A1 * | 6/2012 | Brandt .................. B60J 3/06 362/19 |
| 2013/0293597 A1 * | 11/2013 | Mori .................. G09G 3/007 345/690 |
| 2017/0270381 A1 * | 9/2017 | Itoh .................. G06K 9/00791 |
| 2017/0356612 A1 * | 12/2017 | Leon Esquivel ..... F21S 41/135 |
| 2018/0009295 A1 * | 1/2018 | Jalpa .................. B60J 3/007 |
| 2018/0304727 A1 * | 10/2018 | Choi .................. B60J 3/04 |
| 2019/0007595 A1 * | 1/2019 | Sanchez .............. B60Q 1/143 |
| 2019/0204627 A1 * | 7/2019 | Wang .................. G02F 1/0136 |
| 2019/0232763 A1 * | 8/2019 | Shi .................. B60Q 1/04 |

* cited by examiner

ACTIVE SMART HEADLIGHTS (PRIOR ART)

VEHICULAR SENSING SYSTEM WITH ATTENUATION OF REFLECTED-REFRACTED LIGHT OFF OF PRECIPITATION USING LIGHT POLARIZATION

CROSS REFERENCE TO RELATED APPLICATION

The present application claims the filing benefits of U.S. provisional application Ser. No. 62/639,584, filed Mar. 7, 2018, which is hereby incorporated herein by reference in its entirety.

FIELD OF THE INVENTION

The present invention relates generally to a vehicle sensing system for a vehicle and, more particularly, to a vehicle sensing system that reduces illumination of precipitation.

BACKGROUND OF THE INVENTION

This section provides background information related to the present disclosure which is not necessarily prior art.

Standard vehicle headlights provide improved driver visibility at night by illuminating the road and the surrounding environment. Unfortunately, conventional headlights also illuminate precipitation (i.e. raindrops and snowflakes) which appear as flickering streaks that can be distracting to the driver or to a sensor of the vehicle (e.g., a camera or lidar or radar sensor). FIG. 1 illustrates illumination of precipitation using conventional headlights and a diagrammatical display of the path of a light ray through a raindrop.

As an alternative, an active or "smart" headlight system has been developed in which the headlight is configured as a co-locating imaging and illumination system comprised of a projector, a camera, and a beamsplitter. The camera images the precipitation and the top of the field of view, the processor determines the future location of the particles, and the projector reacts to dis-illuminate the particles. This process to capture the images and react appropriately requires a certain amount of time, for example 13 ms to be completed. FIG. 2A illustrates the components of a smart headlight mentioned above, FIG. 2B illustrates the arrangement of these components, and FIG. 2C illustrates the results of the smart headlight in direct comparison to a conventional headlight.

While smart headlights provide an advantage over conventional headlights, they tend to be very expensive and are prone to failure in the harsh environment of a motor vehicle application. Accordingly, a need exists to develop alternatives to "active" type headlights which also improve upon the illumination characteristics of conventional headlights.

SUMMARY OF THE INVENTION

This section provides a general summary of the disclosure and is not intended to be a comprehensive and exhaustive listing, nor is it intended to limit the scope of the present disclosure.

It is an aspect of the present disclosure to provide a "passive" headlight, referred to as a clearview headlight, configured to use light polarization to minimize precipitation illumination.

The present invention provides a sensing system for a vehicle that includes a sensor disposed at a vehicle with a field of view exterior of the vehicle and a control that includes a processor operable to process sensor data captured by the sensor. The system includes a first polarizer disposed in front of at least one headlight disposed at the vehicle, and light emitted by the at least one headlight passes through the first polarizer to emit polarized light. A second polarizer is disposed in front of the sensor, and light received by the sensor first passes through the second polarizer, and the second polarizer has an opposite-handed configuration relative to the first polarizer. The polarized light reflects and refracts off of precipitation and the second polarizer blocks refracted-reflected light from the precipitation and allows reflected light from the precipitation to pass through to the sensor. The control, responsive to processing of sensor data captured by the sensor via the reflected light, is operable to sense objects in the field of view of the sensor. Further areas of applicability will become apparent from the description provided herein.

BRIEF DESCRIPTION OF THE DRAWINGS

The drawings described herein are for illustrative purposes only of a selected embodiment and are not intended to limit the scope and/or application of the present disclosure. The drawings include.

Corresponding reference numerals indicate corresponding parts throughout the several views of the drawings.

DESCRIPTION OF THE PREFERRED EMBODIMENTS

Figure 1:
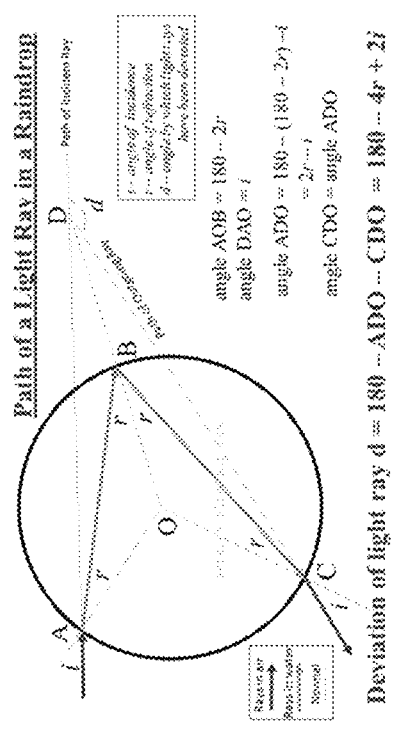
FIG. 1 provides illustrations relating to illumination of precipitation via a conventional headlight in a motor vehicle.

At least one example embodiment is provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring to FIG. 1, conventional headlights emit light that is reflected from the precipitation (i.e., reflects off the front surface of the precipitation) and light that is reflected and refracted off of precipitation (i.e., the light passes through the front surface and reflects off the back surface) and back to the vehicle and driver. Herein, light that only reflects (and does not refract) is referred to as reflected light while light that is reflected and refracted is referred to as refracted-reflected light. The refracted-reflected light from the precipitation may decrease visibility for the driver and/or any sensing systems of the vehicle (e.g., cameras, radar sensors, etc.). FIG. 1 illustrates the refraction and reflection of light from emitted headlights on precipitation and an exemplary vehicle using conventional headlights.

Figure 2A:
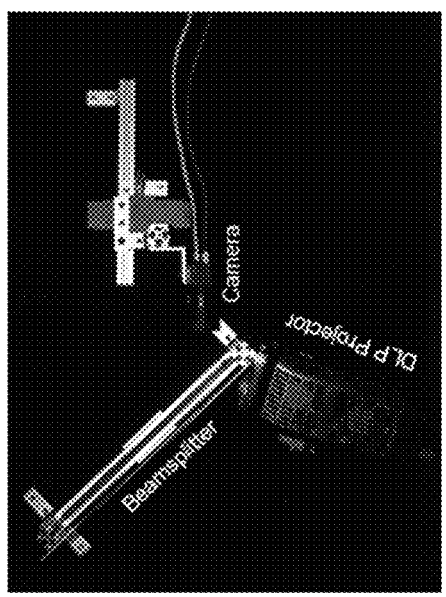
FIGS. 2A-2C illustrate components and arrangements of an active or "smart" headlight configured to reduce illumination of precipitation.
Figure 2C:
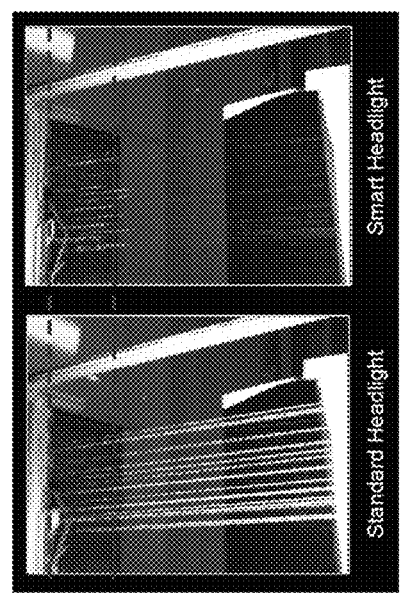
Figure 2B:
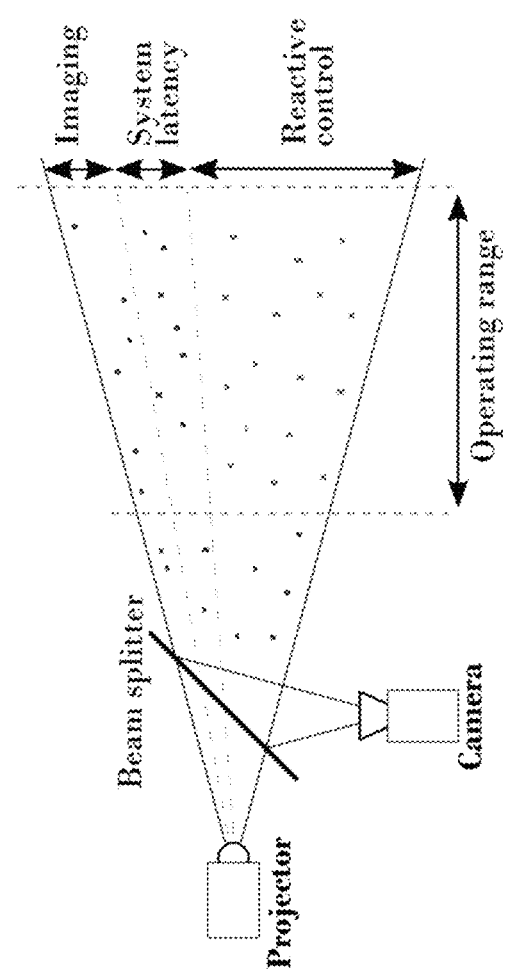

Referring now to FIGS. 2A-2C, one solution for precipitation refracted-reflected light are so called "active" or "smart" headlights. These headlights attempt to constantly redirect light to shine between particles of precipitation. The headlights use a camera to track motion of precipitation and then applies a computer algorithm to predict where the precipitation will be a few milliseconds later. A light projection system (which may include a projector and a beamsplitter) then adjusts to deactivate light beams that would otherwise illuminate the precipitation. However, these active systems are expensive and prone to failure. Furthermore, such systems tend to struggle to maintain effectiveness in heavy precipitation. FIG. 2A illustrates the common components in active headlights (e.g., a camera, a projector, and a beamsplitter) while FIG. 2B illustrates how the system attempts to capture precipitation in a specific field of view and then predict where the precipitation will be lower in the field of view. FIG. 2C provides an example of the effectiveness of the system.

Figure 3B:
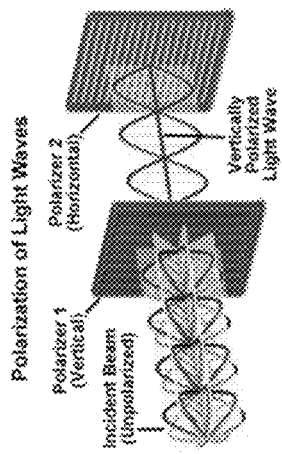
FIGS. 3A-3C illustrate and describe light polarization and reflection/refraction of polarized light used in passive or "clearview" headlights in accordance with the present invention.
Figure 3C:
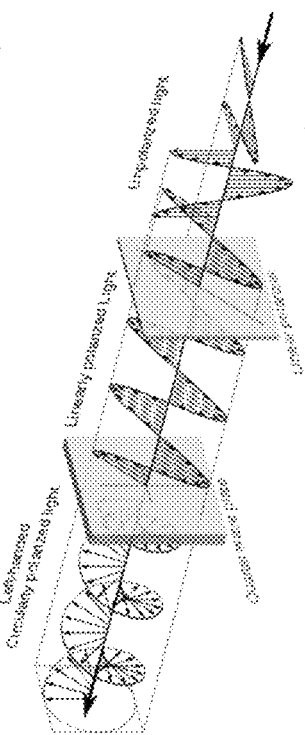
Figure 3A:
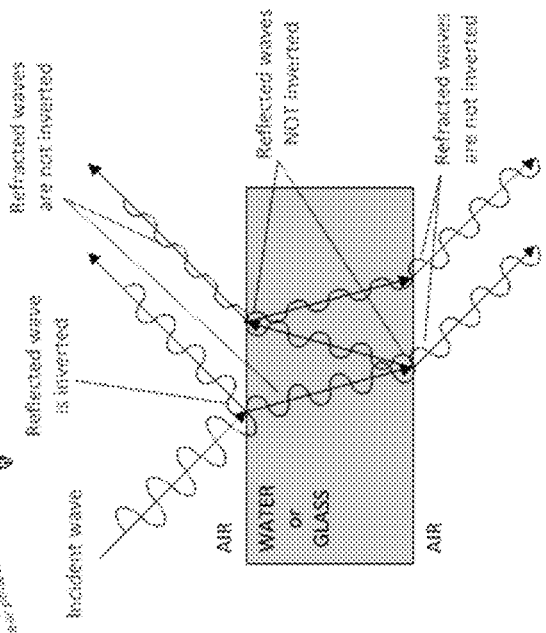

Referring to FIGS. 3A-C and FIG. 4, the present disclosure is directed to a passive precipitation illumination system 10 for a motor vehicle 12 configured to significantly reduce illumination of precipitation (e.g., raindrops, snowflakes, etc.) via a light polarization arrangement. Light may be polarized by passing the light through either circular or elliptical or linear polarization filters. The system 10 includes a first polarizer 14 (e.g., a circular or elliptical polarizer) mounted/installed in front of or on a headlight(s) 16 (e.g., integrated into the glass/plastic or as a film or element attached or adhered to the surface) and an opposite-handed second polarizer 18 mounted/installed in front of or on or at a windshield 20 (e.g., integrated into the glass/plastic or as a film or element attached or adhered to the surface). As such, all light emitted by the headlight 16 passes through the first polarizer 14. This polarized light 22 reflects and refracts (i.e., reflected light and refracted-reflected light) off of precipitation (e.g., rain). As illustrated in FIG. 3A, incident light both reflects and refracts from, for example, water or glass objects (having a higher index of refraction). When light reflects from a boundary with a higher index of refraction, the phase of the light shifts by 180 degrees. However, refracted light does not phase shift. As illustrated in FIGS. 3B and 3C, reflected linear polarized light has the same polarization as the incident light. That is, the phase shift does not change polarization. However, reflected circularly polarized light (or elliptically polarized light) changes handedness (e.g., changes from right-circularly-polarized to left-circularly-polarized according to the right-hand rule). The refracted-reflected light 24 (which has been circularly polarized by the first polarizer 14) is stopped or blocked or attenuated by the second polarizer 18 from passing through the windshield 20 because the refracted-reflected light 24 did not phase shift and is of the opposite handedness as the second polarizer 18. Only reflected light (and other light that is not opposite handedness polarized light), which did phase shift (and therefore matches the handedness of the second polarizer 18), is allowed to pass through the second polarizer unaffected. Light emitted by or reflected off other objects (e.g., streetlights, other vehicles, etc.) that has not been circularly polarized will also remain unaffected and can pass through the second polarizer.

Figure 4:
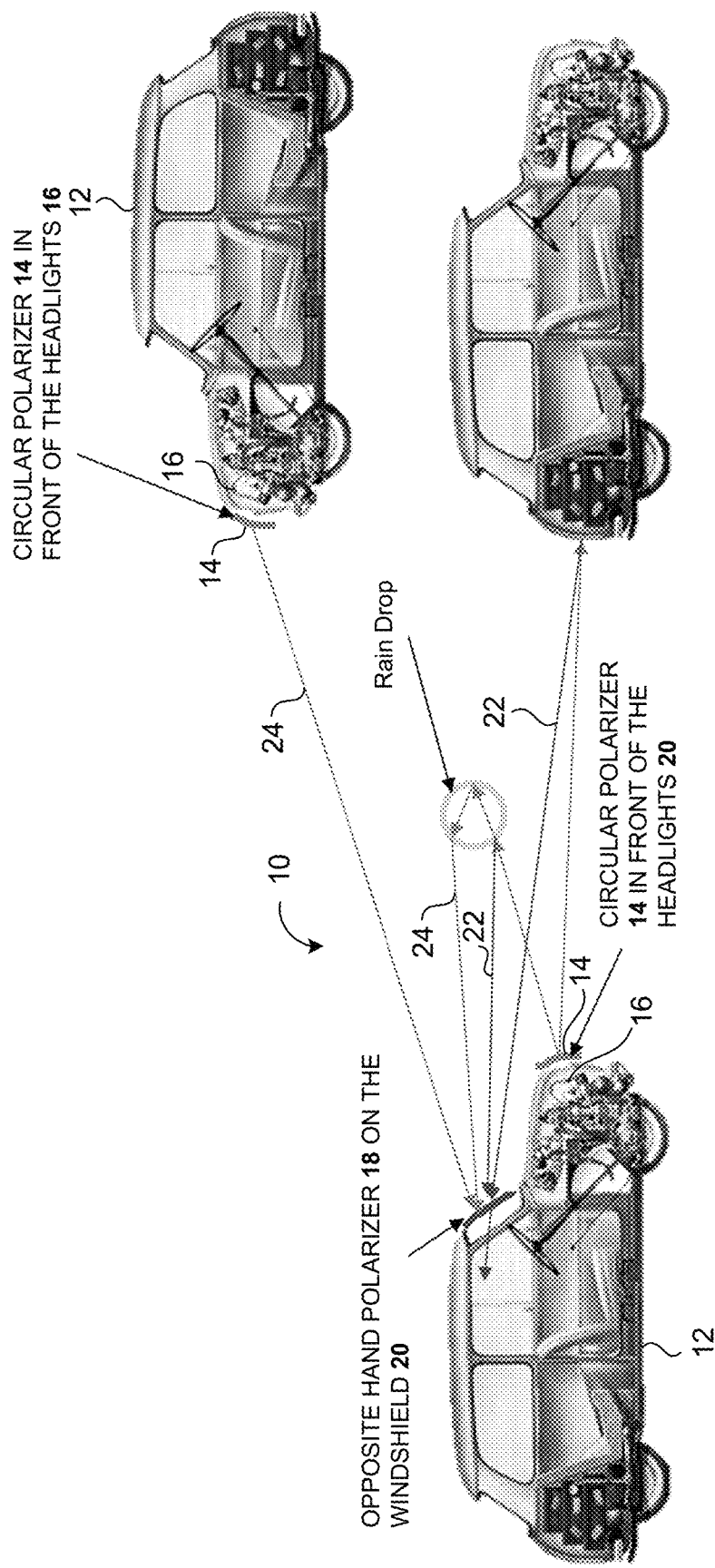
FIG. 4 illustrates and describes installation of the clearview headlights in motor vehicles in conjunction with a windshield-mounted polarizer.

As an option to the passive system previously described, a semi-active system may also be used to turn off or on or toggle the system 10 between OFF and ON states (FIG. 4). For example, a liquid crystal sheet and a quarter waveplate/retarder allows the polarizers to be powered (active) and depowered (inactive). The semi-active system may toggle between the active and inactive state in response to actuation of a user input. For example, the driver may toggle a switch or press a button to activate the system when the driver desires the system to activate. Optionally, the system 12 may include a precipitation sensor (e.g., a rain sensor) that determines the presence of precipitation and automatically activates the polarizer(s) when the presence of precipitation is determined.

In some examples, the entire windshield 20 may be covered by the second polarizer 18. In other examples, only a portion of the windshield is covered by the second polarizer 18. For example, a portion of the windshield 20 that shields a camera or other sensor may be covered by the second polarizer 18. In other examples, a visor (e.g., a sun visor) disposed within the vehicle may include the polarizer 18. The visor may allow the user to adjust a position the polarizer within the vehicle for a desired field of view. Thus, the system 10 may reduce or eliminate refracted-reflected light 24 that may otherwise interfere with the driver or with a vehicle camera or other imaging sensor (such as a forward viewing camera disposed at and behind the windshield and viewing through the windshield and capturing image data for the likes of a driving assist system of the vehicle) while allowing the refracted light (e.g., any polarizable light) to pass through the rest of the windshield 20. In other examples, the second polarizer 18 may not be disposed on the windshield, but instead may be disposed at a cover or lens of a sensor (e.g., the polarizer may be disposed at a cover or lens or may be disposed at an opening or sensing part of the sensor) located at the windshield or at another location on the vehicle (e.g., the bumper, the grill, etc.). The vehicle camera (e.g., forward viewing camera, backup camera, etc.) or sensor may be part of a vehicle vision system and/or driving assist system and/or object detection system. Radar sensors may be used to detect objects within a field of sensing. The system 10 may polarize transmit waves and filter received waves reflected from environmental water to reduce noise caused by precipitation.

The camera or sensor may capture data (such as image data) representative of the scene occurring exterior of the vehicle and in the field of sensing of the camera or sensor, and the driving assist system may process the captured data for display of video images and/or for detection of objects at or near the vehicle and in the field of sensing of the camera or sensor, such as to assist a driver of the vehicle in maneuvering the vehicle in a forward or rearward direction and/or to provide autonomous or semi-autonomous control of the vehicle during such forward or rearward maneuvers. The driving assist system includes a data processor that is operable to receive image data from one or more sensors (e.g., cameras, radar sensors, lidar sensors, etc.) and to provide an output to, for example, a display device for displaying images representative of the captured image data and/or an alert device or controller for generating an output responsive to detection of an object in the path of travel of the vehicle.

The camera or lidar sensor may be sensitive to visible light, infrared light, etc. Optionally, the system may include an auxiliary light source (such as one or more infrared or near infrared light emitting diodes or the like) that is operated to provide illumination for the camera. In such an embodiment, the first polarizer may be disposed at or may be incorporated into the light source, such that the light emitted by the light source is polarized in the manner described above. The auxiliary light source may be operated responsive to the ambient light level at the vehicle (such as determined via an ambient light sensor or other sensor of the vehicle) being at or below a threshold level, whereby the auxiliary light source is activated to enhance capture of image data by the camera during low lighting conditions.

Therefore, the system provides two polarizers that cooperate to reduce or attenuate or block light emitted by a light source of the vehicle (such as the vehicle headlights or rear backup lights or the like) and reflected and refracted off of precipitation from being received at a camera or sensor at the vehicle (such as a forward viewing camera or a rearward viewing camera). The first polarizer is disposed in front of the light source or in the path of the light emitted by the light source, and the second polarizer is disposed in front of the camera or sensor or in the path of light received by the camera or sensor so as to attenuate light refracted by the precipitation, while not attenuating light that reflects off of objects present in the field of sensing of the camera or sensor. This is due to the different behavior of light when it reflects off of water or items with a higher index of refraction, which causes the polarization of the emitted light (polarized by the first polarizer at the light source) to shift by 180 degrees, whereby the reflected light (phase shifted by 180 degrees) is then blocked or substantially attenuated by the second polarizer at the camera or sensor (which has an opposite polarizing axis or direction as compared to the first polarizer). Thus, the camera or sensor does not sense (or senses much less of) the light that is reflected (because of refraction) off of precipitation, but still senses light reflected off of the road and objects and the like present in the field of sensing of the camera or sensor. The system thus provides for enhanced object detection (via processing of data captured by the sensor) and/or provides for enhanced display of video images (derived from image data captured by the camera), since the captured data is not washed out or saturated by reflection off of precipitation present in the field of view of the sensor).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A vehicular sensing system, the vehicular sensing system comprising:

a sensor disposed at a vehicle and having a field of sensing exterior of the vehicle;

a control comprising a processor for processing sensor data captured by the sensor;

a first polarizer disposed in a light emitting path of at least one light source of the vehicle, wherein light emitted by the at least one light source passes through the first polarizer to become polarized light;

a second polarizer disposed in a light receiving path of the sensor, and wherein the second polarizer has an opposite-handed polarization configuration relative to the first polarizer;

wherein some of the polarized light as polarized by the first polarizer impinges precipitation present in the field of sensing of the sensor and reflects off of and is refracted by the precipitation so as to return toward the sensor as refracted-reflected light;

wherein the second polarizer (i) attenuates the light emitted by the at least one light source that is reflected and refracted by the precipitation and that returns toward the sensor as refracted-reflected light and (ii) allows other light emitted by the at least one light source that is reflected from objects present in the field of sensing of the sensor and that returns toward the sensor to pass through the second polarizer so as to be received by the sensor;

wherein sensor data captured by the sensor is representative of light received at the sensor; and wherein the control, responsive to processing at the control of sensor data captured by the sensor, detects objects present in the field of sensing of the sensor.

2. The vehicular sensing system of claim 1, wherein the first polarizer and the second polarizer comprise circular polarizers, and wherein the first polarizer comprises one of a right-hand circular polarizer or a left-hand circular polarizer, and wherein the second polarizer comprises the other of a right-hand circular polarizer or left-hand circular polarizer.

3. The vehicular sensing system of claim 1, wherein the sensor is disposed at an in-cabin side of a windshield of the vehicle and senses through the windshield of the vehicle, and wherein the second polarizer is disposed at the windshield of the vehicle.

4. The vehicular sensing system of claim 3, wherein light perceived by a driver of the vehicle viewing through the windshield passes through the second polarizer.

5. The vehicular sensing system of claim 1, wherein the second polarizer is integrated into the windshield of the vehicle.

6. The vehicular sensing system of claim 1, wherein the second polarizer comprises a polarizing element that is attached to the windshield of the vehicle.

7. The vehicular sensing system of claim 1, wherein at least one selected from the group consisting of (i) the first polarizer and (ii) the second polarizer is operable to toggle between an active state and an inactive state, and wherein, when operating in the active state, the respective polarizer polarizes light, and wherein, when operating in the inactive state, the respective polarizer does not polarize light.

8. The vehicular sensing system of claim 7, wherein the at least one selected polarizer comprises a liquid crystal element and a quarter waveplate.

9. The vehicular sensing system of claim 7, wherein the respective polarizer toggles between the active state and the inactive state in response to actuation of a user input of the vehicle.

10. The vehicular sensing system of claim 7, comprising a precipitation sensor, wherein the respective polarizer toggles between the active state and the inactive state in response to outputs from the precipitation sensor.

11. A vehicular vision system, the vehicular vision system comprising:

a camera disposed at a vehicle and having a field of view exterior of the vehicle;

a control comprising a processor for processing image data captured by the camera;

a first polarizer disposed in a light emitting path of at least one light source of the vehicle, wherein light emitted by the at least one light source passes through the first polarizer to become polarized light;

a second polarizer disposed in a light receiving path of the camera, and wherein the second polarizer has an opposite-handed polarization configuration relative to the first polarizer;

wherein some of the polarized light as polarized by the first polarizer impinges precipitation present in the field of view of the camera and reflects off of and is refracted by the precipitation so as to return toward the camera as refracted-reflected light;

wherein the second polarizer (i) attenuates the light emitted by the at least one light source that is reflected and refracted by the precipitation and that returns toward the camera as refracted-reflected light and (ii) allows other light emitted by the at least one light source that is reflected from objects present in the field of view of the camera and that returns toward the camera to pass through the second polarizer so as to be received by the camera;

wherein image data captured by the camera is representative of light received at the camera; and wherein the control, responsive to processing at the control of image data captured by the camera, detects objects present in the field of view of the camera.

12. The vehicular vision system of claim 11, wherein the first polarizer and the second polarizer comprise circular polarizers, and wherein the first polarizer comprises one of a right-hand circular polarizer or a left-hand circular polarizer, and wherein the second polarizer comprises the other of a right-hand circular polarizer or left-hand circular polarizer.

13. The vehicular vision system of claim 11, wherein the camera is disposed at an in-cabin side of a windshield of the vehicle and views through the windshield of the vehicle.

14. The vehicular vision system of claim 13, wherein the second polarizer is disposed at the windshield of the vehicle.

15. The vehicular vision system of claim 11, wherein the second polarizer is disposed at a lens of the camera.

16. The vehicular vision system of claim 11, wherein at least one selected from the group consisting of (i) the first polarizer and (ii) the second polarizer is operable to toggle between an active state and an inactive state, and wherein, when operating in the active state, the respective polarizer polarizes light, and wherein, when operating in the inactive state, the respective polarizer does not polarize light.

17. The vehicular vision system of claim 16, wherein the at least one selected polarizer comprises a liquid crystal element and a quarter waveplate.

18. A vehicular sensing system, the vehicular sensing system comprising:

a sensor disposed at a vehicle and having a field of sensing exterior of the vehicle;

wherein the sensor is disposed at an in-cabin side of a windshield of the vehicle and senses through the windshield of the vehicle;

a control comprising a processor for processing sensor data captured by the sensor;

a first polarizer disposed in a light emitting path of at least one light source of the vehicle, wherein light emitted by the at least one light source passes through the first polarizer to become polarized light;

a second polarizer disposed in a light receiving path of the sensor, and wherein the second polarizer has an opposite-handed polarization configuration relative to the first polarizer;

wherein the second polarizer is disposed at the windshield of the vehicle;

wherein some of the polarized light as polarized by the first polarizer impinges precipitation present in the field of sensing of the sensor and reflects off of and is refracted by the precipitation so as to return toward the sensor as refracted-reflected light;

wherein the second polarizer (i) attenuates the light emitted by the at least one light source that is reflected and refracted by the precipitation and returns toward the sensor as refracted-reflected light and (ii) allows other light emitted by the at least one light source that is reflected from objects present in the field of sensing of the sensor and that return toward the sensor to pass through the second polarizer so as to be received by the sensor;

wherein the first polarizer and the second polarizer comprise circular or elliptical polarizers, and wherein the first polarizer comprises one of a right-hand polarizer or a left-hand polarizer, and wherein the second polarizer comprises the other of a right-hand polarizer or left-hand polarizer;

wherein sensor data captured by the sensor is representative of light received at the sensor; and wherein the control, responsive to processing at the control of sensor data captured by the sensor, detects objects present in the field of sensing of the sensor.

19. The vehicular sensing system of claim 18, wherein at least one selected from the group consisting of (i) the first polarizer and (ii) the second polarizer is operable to toggle between an active state and an inactive state, and wherein, when operating in the active state, the respective polarizer polarizes light, and wherein, when operating in the inactive state, the respective polarizer does not polarize light.

20. The vehicular sensing system of claim 19, wherein the at least one selected polarizer comprises a liquid crystal element and a quarter waveplate.

\* \* \* \* \*